United States Patent
Petersen

(10) Patent No.: US 11,905,922 B2
(45) Date of Patent: *Feb. 20, 2024

(54) GASKET FOR WIND TURBINE

(71) Applicants: Pur Wind ApS, Kolding (DK); ROSEN Swiss AG, Stans (CH)

(72) Inventor: Claus Nissen Petersen, Kolding (DK)

(73) Assignees: Pur Wind ApS, Kolding (DK); ROSEN Swiss AG, Stans (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,432

(22) Filed: Apr. 11, 2022

(65) Prior Publication Data

US 2022/0316447 A1     Oct. 6, 2022

Related U.S. Application Data

(63) Continuation of application No. 16/093,487, filed as application No. PCT/EP2017/059092 on Apr. 18, 2017, now Pat. No. 11,319,930.

(30) Foreign Application Priority Data

| Apr. 15, 2016 | (EP) | 16165479 |
| May 10, 2016 | (EP) | 16168839 |
| Nov. 11, 2016 | (EP) | 16198309 |

(51) Int. Cl.
  *F03D 13/10* (2016.01)
  *F03D 13/20* (2016.01)
  *F03D 13/25* (2016.01)

(52) U.S. Cl.
  CPC ............ *F03D 13/10* (2016.05); *F03D 13/22* (2016.05); *F03D 13/25* (2016.05);
(Continued)

(58) Field of Classification Search
  CPC .......... F03D 13/10; F03D 13/22; F03D 13/25; F05B 2240/912; F05B 2240/95
  See application file for complete search history.

(56) References Cited

U.S. PATENT DOCUMENTS

| 5,149,108 A * | 9/1992 | Leiszter ............... F16J 15/067 403/364 |
| 2004/0169376 A1* | 9/2004 | Ruer ..................... E02D 27/425 290/55 |

(Continued)

FOREIGN PATENT DOCUMENTS

| CN | 2013881949 | 1/2010 |
| CN | 101798882 A | 8/2010 |

(Continued)

OTHER PUBLICATIONS

International Search Report and Written Opinion dated Jun. 16, 2017 in International Application No. PCT/EP2017/059092.

(Continued)

*Primary Examiner* — Sean Gugger
(74) *Attorney, Agent, or Firm* — ICE MILLER LLP

(57) ABSTRACT

The present invention relates to a gasket adapted for being placed between a transition piece and a monopile of a wind turbine. One embodiment relates to a gasket for formfitting the bottom part of a transition piece of a wind turbine, the gasket primarily manufactured in an elastomeric material and shaped as a hollow elongated body for surrounding at least a part of the monopile when mounted between the transition piece and the monopile, such that the gasket stabilizes the position of the transition piece relative to the monopile. The presently disclosed gasket can substitute the traditional grouting or bolting procedures when mounting a transition piece on a monopile.

18 Claims, 12 Drawing Sheets

(52) U.S. Cl.
CPC ..... *F05B 2240/912* (2013.01); *F05B 2240/95* (2013.01); *F05B 2280/5001* (2013.01)

(56) References Cited

U.S. PATENT DOCUMENTS

| | | | |
|---|---|---|---|
| 2006/0185279 A1 | 8/2006 | Eusterbarkey | |
| 2008/0150292 A1* | 6/2008 | Fedor | F03D 13/20 290/55 |
| 2013/0224020 A1* | 8/2013 | Dagher | F03D 13/25 416/84 |
| 2015/0233359 A1* | 8/2015 | Holt | F03G 3/06 60/698 |
| 2016/0305405 A1* | 10/2016 | Kraft | E04H 12/185 |

FOREIGN PATENT DOCUMENTS

| | | |
|---|---|---|
| CN | 102852156 A | 1/2013 |
| CN | 202672171 U | 1/2013 |
| CN | 103147458 A | 6/2013 |
| CN | 203296059 U | 11/2013 |
| CN | 203403663 U | 1/2014 |
| CN | 204530751 U | 8/2015 |
| DE | 202012005538 U1 | 9/2013 |
| DE | 102013012712 A1 | 2/2015 |
| DE | 102013019288 A1 | 5/2015 |
| EP | 2518306 A1 | 10/2012 |
| EP | 2594696 A1 | 5/2013 |
| EP | 2604757 A2 | 6/2013 |
| EP | 2672016 A1 | 12/2013 |
| EP | 3064309 A1 | 9/2016 |
| FR | 2248389 A1 | 5/1975 |
| GB | 2505192 A | 2/2014 |
| JP | 2002129778 A | 5/2002 |
| JP | 2003534473 A | 11/2003 |
| JP | 2005344421 A | 12/2005 |
| JP | 2009092069 A | 4/2009 |
| JP | 2013253536 A | 12/2013 |
| JP | 2015055046 A | 3/2015 |
| JP | 2015513046 A | 4/2015 |
| NL | 2017594 B1 | 4/2018 |
| RU | 2007104928 A | 8/2008 |
| WO | 2005005752 A1 | 1/2005 |
| WO | 09026933 A1 | 3/2009 |
| WO | 2013057459 A1 | 4/2013 |
| WO | 2015082631 A1 | 6/2015 |
| WO | 2018070868 A1 | 4/2018 |

OTHER PUBLICATIONS

International Preliminary Report on Patentability dated Jun. 25, 2018 in International Application No. PCT/EP2017/059092.

* cited by examiner

GASKET FOR WIND TURBINE

CROSS-REFERENCE TO RELATED APPLICATIONS

This application is continuation of U.S. application Ser. No. 16/093,487, filed Oct. 12, 2018, which is a Section 371 of international Application No. PCT/EP2017/059092, filed Apr. 18, 2017, which was published in the English language on Oct. 19, 2017 under International Publication No. WO 20171178657 A1, which claims priority under 35 U.S.C. § 119(b) to European Application No, 16165479.3, filed Apr. 15, 2016, European Application No. 16168839.5, filed May 10, 2016, and European Application No. 16198309.3, filed Nov. 11, 2016. The disclosures of each of the foregoing applications are incorporated herein by reference in their entireties.

FIELD OF INVENTION

The present invention relates to a gasket for mounting offshore wind turbine structures, such as a gasket adapted for being placed between a transition piece and a pile structure, such as a monopile of a wind turbine, or a pile for a tripod or a tetrapod of a wind turbine. The gasket is further suitable for mounting other offshore wind turbine related structures with corresponding structural geometries, such as multiple tower sections.

BACKGROUND OF INVENTION

Large scale structures, such as wind turbines and offshore wind turbines, are typically mounted on an assembly of a monopile and a transition piece. One end of the monopile is fixed into the ground or seabed, and at the other (upper) end of the monopile, the transition piece is mounted. Thus the assembly provides a level platform for mounting the turbine itself. Hence the bottom part of the transition piece is mounted on the upper part of the monopile.

The assembly of transition piece and monopile carries the load of the wind turbine. It is therefore essential that the assembly is stable, and that the transition piece does not move relative to the monopile.

Conventionally the transition piece is fixed or stabilized relative to the monopile by grouting or by bolting the two together—or a combination hereof. The monopile and the transition piece are cylindrical bodies that are concentrically arranged with a space in between, and the two bodies are then mounted and fixed together by a grout seal formed in the annular space between the monopile and transition piece, and/or by bolting the transition piece and the monopile together, for example by bolting corresponding flanges of the two elements.

After installation, the assembly will be subject to significant stresses as vibrations from operation as well as movements from waves, wind and tide, may induce movement of the monopile relative to the transition piece. The conventional grout suffers from cracking and failure after installation, which leads to instability of the assembly, and the transition piece will typically gradually move downwards relative to the monopile over time.

To reduce the risk of cracks in the grout, and to minimize the risk of failure of the seal, the grout may comprise elastically compressible components, such as foamed polyurethane, as disclosed in EP 2672016.

Alternatively, or additionally to the grout, any movements between the transition piece and monopile, may be reduced by use of multiple discrete bearing parts mounted between the transition piece and monopile. The discrete bearing parts may comprise elastomeric components such as polyurethane, as described in EP 2518306 or rubber as described in EP 2604757.

The elastomeric components may have additional advantages. DE 10 2013 019 288 discloses an offshore pile covered at least partly by a vibration-reducing coating, which may be a viscoeleastic polymer, rubber, silicone rubber, polyurethan, elastomer, thermoplastic elastomer, or bitumen. The coating is disclosed to reduce the noise during installation of the offshore pile into the seabed.

To further strengthen the wind turbines and offshore wind turbines, the large scale structures may be mounted on pile structures other than monopiles. Other pile structures include any type of jacket foundation, such as a tripod or tetrapod foundation. The wind turbines may further comprise multiple tower sections to increase the height of the wind turbine and/or to improve the stress tolerances of the mounted structure.

Despite the advances on the grout and/or discrete bearing parts, as well as the structural advances of the pile structures, there is a need for a more long-term durable and efficient stabilization of the transition piece relative to the pile structure, as well as the stabilization of the elements constituting the transition piece, such as the tower sections. There is furthermore a need for a simpler and more cost-efficient method for assembling and mounting the transition piece(s) and/or for assembling and mounting the transition piece(s) to the pile structure, such as to the monopile.

SUMMARY OF INVENTION

The present disclosure relates to a gasket for mounting and fixing a transition piece to a pile structure, such as a monopile, which is particularly suitable for offshore monopiles. Tice present disclosure further relates to a gasket for mounting and fixing multiple transition pieces, such as multiple tower sections. The presently disclosed gasket provides a more stable and long-term durable assembly of two members, as well as a simpler method for assembling two members, such as the monopile and transition piece, thus improving the cost efficiency of the installation of a wind turbine. Thus, the presently disclosed gasket is configured to be load bearing and load absorbing, e.g. it is configured to carry the load of a large-scale structure such as a transition piece. The load bearing configuration further facilitates that two members that do not match perfectly in geometry can be mounted and fixed together. For example a pile structure and a transition piece that is not fully concentric and/or where one of the members are cylindrical and the other member is more oval cylindrical. The presently disclosed gasket further provides a joint between two large-scale members such that the use of mortar, grout, sand, gravel, cement, and/or concrete can be avoided. Thus, the gasket provides improved flexibility and simplicity to the manufacturing and assembling of the gasket to the pile structure and transition piece. For example the gasket may be manufactured and solidified independently of the pile structure and transition piece, such as manufactured as an independent part that is subsequently mounted to the pile structure and/or transition piece.

A first aspect of the present disclosure relates to a gasket for formfitting the bottom part of a transition piece of a wind turbine, the gasket primarily manufactured in an elastomeric material and shaped as a hollow elongated body for surrounding at least a part of the pile structure, such as a pile for a monopile, a tripod, or a tetrapod, when mounted between the transition piece and the pile structure, such that the gasket stabilizes the position of the transition piece relative to the pile structure. I.e. the gasket typically surrounds the top outer surface of the pile structure and abuts the bottom inner surface of the transition piece.

The present disclosure is further suitable for assembling sections of the transition piece. A further aspect of the invention relates to a gasket for formfitting the bottom part of a first transition piece section, such as the bottom part of a first tower section, the gasket primarily manufactured in an elastomeric material and shaped as a hollow elongated body for surrounding at least a part of a second transition piece section, such as the upper part of a second tower section, when mounted between the first transition piece section and the second transition piece section, such that the gasket stabilizes the position of the first transition piece section relative to the second transition piece section.

A second aspect of the present disclosure relates to a gasket, preferably adapted for matching and/or formfitting the bottom part of a transition piece of a wind turbine. The gasket may therefore be shaped as a hollow elongated body. In the preferred embodiment the gasket is primarily manufactured in an elastomeric material, such as PUR. The gasket is preferably a self-supporting structure. The gasket can thereby surround at least a part of the monopile when mounted between the transition piece and the monopile, i.e. in a sandwich structure between the transition piece and the monopile, such that the gasket stabilizes the position of the transition piece relative to the monopile during and after assembly of the two elements.

In a preferred embodiment of the first aspect of the invention, the gasket is assembled from multiple parts. In a further preferred embodiment, the gasket is assembled from multiple parts, where each part is configured to match the abutting parts. Optionally the multiple parts are matching each other in a similar manner as a puzzle, where abutting edges of abutting parts can be fitted in only predetermined ways. In a preferred embodiment the abutting parts are cylindrical or cone-shaped, where the parts can be placed on top of each other, or in extension of each other, thereby forming a cylinder or cone with a height that is the cumulative height of the assembled parts. In a further preferred embodiment, the abutting parts are cylindrical or cone-shaped and at least one of the edges along the top and bottom perimeters form an acute angle, such that abutting parts can be matched or assembled in a wedge manner.

A third aspect of the present disclosure relates to the use of the gasket according to the first or second aspects of the invention, for mounting offshore structures, such as mounting a transition piece to a pile structure, such as a monopile, a pile for a tripod or a tetrapod, and/or for mounting the transition piece, such as mounting multiple tower sections.

A fourth aspect of the present disclosure relates to a method for mounting a transition piece of a wind turbine to a monopile. A first step may be mounting the presently disclosed gasket in the bottom part of the transition piece. This mounting procedure may be provided in land such that the gasket is located, fitted and fixed in the bottom part of the transition piece when transported to the location of the monopile. A further step is the assembly of the transition piece and the monopile at the location where the monopile has been mounted in ground, e.g. at an off-shore position. The transition piece and the monopile may be concentrically arranged with the gasket in between.

The gasket then ensures that there is a fixed seal between the transition piece and the monopile. And most importantly: The assembly of the transition piece onto the monopile can be provided without the use of grouting and/or bolting, making the presently disclosed gasket and method a very cost efficient solution for installation of off-shore wind turbines.

A fifth aspect of the present disclosure relates to a method for mounting multiple tower sections for a wind turbine, the method being carried out optionally onshore or offshore, comprising the steps of: providing a first tower section, mounting the gasket according to the first aspect to a first end of the first tower section, assembling a second tower section to the first end of the first tower section, such that the gasket is sandwiched between the two sections, and repeating the process for all tower sections.

A sixth aspect of the present disclosure relates a method for mounting the pile foundation of a wind turbine, such as a jacket foundation, comprising the steps of: providing one or more legs for the foundation, wherein each leg comprises a lower part for contact with the seabed and one or more upper parts for contact to the transition piece, mounting the gasket according to the first aspect to the lower part legs assembling the lower part legs to the upper part legs, such that the gasket is sandwiched between the two leg parts.

In a preferred embodiment of the sixth aspect of the invention, the foundation is a jacket foundation, such as a tripod or tetrapod foundation.

A seventh aspect of the present disclosure relates to the manufacture of a gasket for formfitting the bottom part of a transition piece of a wind turbine to a pile structure. In a preferred embodiment, the gasket is manufactured by a casting process, such as mold casting, and the gasket and transition piece may be assembled at the offshore site or onshore. In another preferred embodiment, the gasket is manufactured by a spraying process or a coating process, such as thermal spraying or spray drying, onto the inner surface of the transition piece or the bottom part of the transition piece. Preferably the transition piece is coated with the gasket before assembly either off-shore or onshore. Optionally the transition piece is coated onshore, such as at the transition piece production site. In a further preferred embodiment, the gasket is made by spraying a solution of polyureas whereby the gasket is formed as a coating of polyurea.

A preferred embodiment of the seventh aspect of the invention relates to a method for manufacturing a gasket for the bottom part of a transition piece of a wind turbine, the method comprising the steps of:
 gradually spraying fluid elastomeric material onto the bottom inner surface of a section of the transition piece that will be assembled with a pile structure, such that a layer of elastomeric material is formed, and
 curing the layer of elastomeric material such that a gasket is formed.

Another preferred embodiment of the seventh aspect of the invention relates to a method for manufacturing a gasket for the bottom part of a transition piece of a wind turbine, the method comprising the steps of:
 pouring fluid elastomeric material into one or more preformed molds, and
 curing the elastomeric material to form a gasket comprising one or more parts.

DESCRIPTION OF DRAWINGS

The invention will in the following be described in greater detail with reference to the accompanying drawings.

FIG. 1 shows a transition piece 2 mounted on a monopile 1 where the upper part of the monopile 1 is encased in an embodiment of the presently disclosed gasket 3.

FIG. 2 shows an embodiment of the presently disclosed gasket 3 shaped as a hollow truncated cone having a flange 4 at the upper part. The longitudinal centre and longitudinal direction of the monopile is indicated by the line D-D.

FIG. 3 shows another embodiment of the presently disclosed gasket 3' shaped as a hollow truncated cone, where the curved surface of the cone further comprises multiple holes.

FIG. 5 shows another embodiment of the presently disclosed gasket 3" shaped as a hollow truncated cone, where the cone is assembled from the three parts 1-3.

DETAILED DESCRIPTION

The presently disclosed gasket 3, 3', 3", 3''', 3'''', 3''''', 3-1 can replace grouting and bolting that are the current standard procedures when a transition piece is mounted on a monopile. Grouting can only be performed on the part of the monopile that is above sea level and grouting can only be performed in certain weather conditions, such as above a certain temperature. Also bolting the two elements together is a complicated, time consuming and expensive procedure. The presently disclosed gasket 3, 3', 3", 3''', 3'''', 3''''', 3-1 can be used in situations where the assembly between the monopile and the transition is below sea level making it possible to lower the point of assembly between transition piece and monopile. In some cases the assembly point of transition piece and monopile can be lowered by as much as 10 meters with the use of the presently disclosed gasket, thereby significantly lowering the centre of mass of the entire wind turbine construction.

The presently disclosed gasket is furthermore not depending on the weather conditions to the same degree as grouting. The gasket can also be installed in the bottom part of the transition piece on land before transportation to the location of the monopile. For example, a bottom part of the transition piece, such as the inner surface of a cylindrical transition piece, can be coated or spray coated to form a gasket that is attached to the transition piece. The herein disclosed gasket can thereby provide a significant cost reduction to the installation of wind turbine, especially off-shore wind turbines.

The presently disclosed gasket may further minimize the relative movements between the monopile and the transition piece: for example movements induced by vibrations, waves, wind and tide during operation of a wind turbine. The presently disclosed gasket may further act as a seal between the monopile and transition piece. The presently disclosed gasket may further be able to accommodate mismatch in geometrical tolerances between the monopile and the transition piece.

Figure 1A:
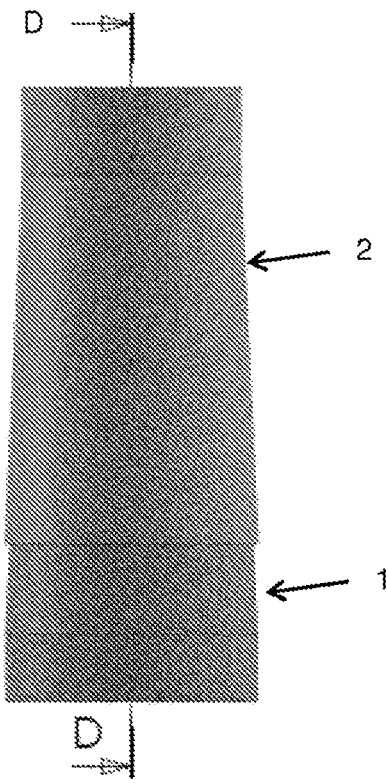
FIG. 1A shows the assembly in a perspective side view, and where the line D-D indicates the central and longitudinal direction of the monopile 1. The gasket is not visible in FIG. 1A.
Figure 1B:
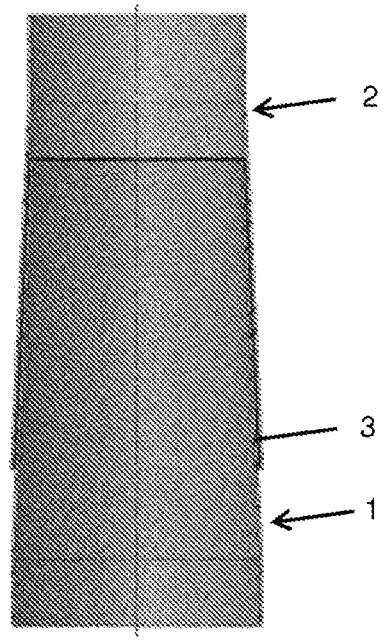
FIG. 1B shows a vertical cross section of the assembly, and where the line D-D from FIG. 1A is included for reference. The gasket 3 is now visible sandwiched between the transition piece 2 and the monopile 1.
Figure 2A:
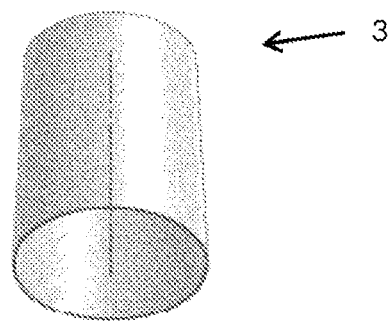
FIG. 2A shows a perspective view from the bottom of the gasket 3.
Figure 2B:
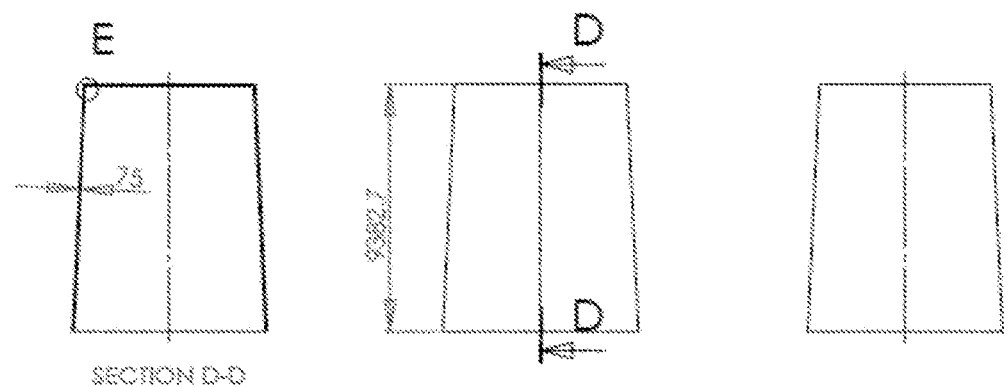
FIG. 2B shows vertical cross sectional views, where the truncated cone shape is seen, and exemplary dimensions of the gasket are further indicated.
Figure 2C:
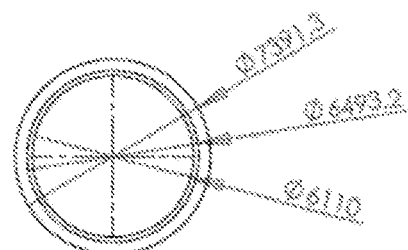
FIG. 2C shows a horizontal cross sectional view of the cone, illustrating the lower and upper diameters of the truncated cone and the flange 4. Exemplary dimensions are further indicated.
Figure 2D:
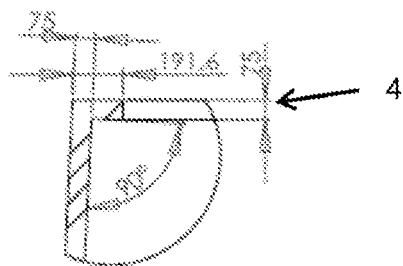
FIG. 2D shows an enlarged view of an embodiment of the flange 4 of the gasket 3. The enlarged view corresponds to the area indicated as "E" in FIG. 26. The flange 4 comprises a flange portion that is extending in the horizontal and radial direction of the cone, thus the horizontal portion of the flange forms an angle above 90° relative to the wall of the cone. Exemplary dimensions of wall thickness and the extension of the horizontal flange portion are indicated.

FIG. 1 shows a monopile 1 with slightly conical, almost cylindrical, shape, and an embodiment of the presently disclosed gasket 3 surrounding a part of the monopile 1, FIG. 1A shows the assembly of monopile and transition piece in a side view where the gasket is not visible, and FIG. 1B shows a vertical cross section of the assembly where the gasket 3 is visible sandwiched between monopile 1 and transition piece. From FIG. 1 it is seen that the gasket 3 has the shape of a hollow elongated body, in this case a truncated cone.

The bottom part of the transition piece 2 will be mounted on top of, or around, the gasket 3 as best illustrated in FIGS. 1 and 4. After assembly and installation of the wind turbine, movement of the monopile 1 and/or transition piece 2 may be induced due to vibrations and weather. The movements will create stresses that are transferred to the gasket 3. Depending on the properties of the gasket, the stresses may be further transferred to other parts of the assembly.

To minimize the movements within the assembly, and thereby stabilize the position of the transition piece relative to the monopile, it is advantageous that the gasket 3 can absorb the stresses. An elastomeric material is viscoelastic, i.e. has both viscous and elastic properties, and is therefore suitable for absorbing stresses.

The gasket of the present disclosure is therefore preferably primarily manufactured in an elastomeric material, and is thus configured to absorb stresses, where the stresses may be any type of stress, and the stress may have any direction.

In one embodiment the gasket is configured to stabilize the position of the transition piece relative to the monopile by absorbing compression, tension, and/or shear stresses occurring due to movements of the transition piece and/or monopile relative to each other.

The gasket may be exposed to compression, tension and/or shear stresses. However, during operation of a wind turbine, compression of the gasket will be prevalent. Failure of the gasket due to high compression forces is therefore critical and must be avoided. In a further embodiment of the invention, the gasket is therefore configured to tolerate compression forces above 10 N/mm$^2$, more preferably above 15 N/mm$^2$, and most preferably above 20 N/mm$^2$.

The gasket of the present disclosure is configured to be load bearing. It is therefore essential that the elastomeric material possess a certain hardness. The gasket may be manufactured from selected elastomeric material types known in the art, and manufactured by selected processes known in the art, whereby the required hardness may be obtained.

The gasket may be manufactured by a casting process, such as mold casting. A casting process includes pouring a fluid form of the elastomeric material, or a precursor thereof, into one or more preformed molds. The material is subsequently cured, or hardened, to form the gasket. Thus, the gasket may be cast in one or more piece(s) that are freestanding unit(s). When multiple parts are cast, the multiple cast parts may subsequently be assembled to form the gasket. The cast gasket and/or gasket parts may be assembled both at the off-shore site or onshore.

The gasket may also be manufactured by a spraying process or a coating process, such as thermal spraying or spray drying. A spraying or coating process includes spraying a fluid form of the elastomeric material, or a precursor thereof, onto a surface, such as the surface on the transition piece. The process may be restricted to certain parts of the surface, such as the bottom inner surface of a section of the transition piece that will be assembled with a pile structure. The sprayed coating forms a layer of elastomeric material that is subsequently cured, or hardened, whereby the gasket is formed.

In this case the gasket is formed as a coating that is applied on the bottom part of the transition piece, such as the inner surface of a cylindrical transition piece. In this case it is further advantageous that the transition piece may be coated with the gasket before assembly either off-shore or onshore. Optionally the transition piece is coated/sprayed onshore, such as at the transition piece production site. Spraying or coating is typically a more expensive manufacturing process than casting but has the advantage that the transport of the raw materials for the spraying/coating is more cost-efficient than transport of a casted gasket. A further advantage of the spraying/coating process is that it is ensured that the gasket is formfitted to the actual inner surface of the transition piece.

Elastomeric materials that may be configured to be load bearing include polyurethanes (PUR). In a further embodiment the elastomeric material is selected from the group consisting of: polyurethane (PUR), rubber, nylon, polyoxymethylene (POM), polyethylen (PE), polyurea, and any combination thereof. The most preferred material is polyurethane (PUR) and/or polyurea.

Elastomeric materials may be manufactured by casting processes or spraying processes. For certain elastomeric materials, it may be advantageous to use a spraying process due to the physical properties of the liquid elastomer. In a preferred embodiment, the spraying system is a polyurethane system, such as polyurea hot and cold casted systems. In a further preferred embodiment, the gasket made by spraying consists of polyurea.

In a further embodiment the elastomeric material has a shore A hardness according to ASTM D2240 of at least 70, more preferably at least 80, more preferably at least 85, even more preferably between 70-120, more preferably between 80-100, and most preferably between 85-95. In a further embodiment, the elastomeric material has a shore D hardness of at least 50, more preferably at least 60, and most preferably at least 75. In a further embodiment, the gasket comprises a polyurea with a shore D hardness of at least 75, wherein the gasket is preferably made by a spraying/coating process.

The gasket is preferably primarily manufactured in an elastomeric material, and the ability of the gasket to absorb stresses will depend on the amount of elastomeric material. The higher the amount of elastomeric material, the better the stress absorption. The gasket may therefore comprise between 70-100% elastomeric material, more preferably 90-100%, and even more preferably 95-100%, and most preferably 99-100% of elastomeric material.

It may be further advantageous that the gasket comprises certain types of polyurethanes.

Polyurethane elastomers are prepared from the reaction of diisocyanates, long-chain polyols and short-chain extenders. By varying each component, the properties of polyurethane elastomers can be tuned to meet the needs of specific applications.

A cast polyurethane elastomer may be formed by reaction between diisocyanates and polyether/polyester polyols to form a prepolymer, and subsequent reaction between said prepolymers and the chain-extenders. Upon reaction and curing, a three-dimensional structure of the elastomer is formed.

In a preferred embodiment, the diisocyantes are selected from the group of: toluene diisocyanate (TDI), diphenylmethane diisocyanate (MDI), aliphatic and unconventional isocyanates, and any combinations thereof.

In a preferred embodiment, the polyols are selected from the group of: polyether and/or polyester polyols. In a further preferred embodiment, the polyether/polyester polyols are selected from the group of: polypropylene glycol (PPG), polytetramethylene ether glycol (PTMEG), polyadipate, polycaprolactone, unconventional polyols, and any combinations thereof.

In a preferred embodiment, the prepolymers formed by reaction between diisocyanates and polyether/polyester are selected from the group of: the Desmodur® line of prepolymers, including: Conventional TDI and MDI-terminated polyether and polyester-based prepolymers processed using hot casting methods; Mercury-free MDI systems; Prepolymers with low unreacted TDI content for reduced operator exposure to TDI; Quasi-MDI prepolymers with ether or ester backbones; Amine cross-linked MDI prepolymers with processing profiles comparable to TDI prepolymers; and Prepolymers terminated with specialty diisocyanates.

The invention encompasses all solid plastics, which comprise mainly of macromolecules Examples of these include thermoplastics (such as polyethylene or polypropylene, etc.), thermosets (such as epoxy or melamine resins, etc.), elastomers (such as natural or synthetic rubber, etc.), and thermoplastic elastomers (such as thermoplastic copolyamides or polyester elastomers).

Preferably, but not exclusively, polyurethane, polyurea or polyurethane-polyurea hybrid compounds are used in the context of this invention. These are hereinafter referred to as polyisocyanate polyaddition products.

These include, in particular, compact polyisocyanate polyaddition products, such as elastomers, duromers, polyisocyanate polyaddition casting resins or thermoplastic polyisocyanate polyaddition products, and foams based on polyisocyanate polyaddition products, such as flexible foams, semi-rigid foams, rigid foams or integral foams, and polyisocyanate polyaddition product coatings and binders.

In the context of the invention, polyisocyanate polyaddition products are also to be understood as meaning polymer blends containing polyisocyanate polyaddition products and further polymers, as well as foams from these polymer blends.

Preference is given to compact polyisocyanate polyaddition products, coatings or integral foams, more preferably compact polyisocyanate polyaddition products and coatings, particularly polyisocyanate polyaddition product resins, polyisocyanate polyaddition product cast elastomers and thermoplastic polyisocyanate polyaddition products and coatings, and very particularly preferably polyisocyanate polyaddition product casting resins, also referred to as polyisocyanate polyaddition product duromers, and polyisocyanate polyaddition product cast elastomers and coatings.

Within the scope of the invention, a compact polyurethane or a solid polyurethane is to be understood as meaning a solid body essentially free of gaseous inclusions. In this case, "substantially free of gas inclusions" means that the polyurethane preferably contains less than 20% by volume, particularly preferably less than 10% by volume, in particular less than 5% by volume and very particularly less than 2% gas inclusions.

Thermoplastic polyurethanes are understood as meaning compact polyisocyanate polyaddition products which exhibit thermoplastic properties. Thermoplastic properties are understood to mean that the thermoplastic polyisocyanate polyaddition product can be melted repeatedly during heating and exhibits plastic flow during heating.

By polyisocyanate polyaddition product casting resins are meant compact polyisocyanate polyaddition products which are obtained by mixing the raw materials and subsequently casting the reaction mixture into molds.

For coating larger surfaces, the casting resins are poured out and distributed, for example, by doctoring or using doctor blades.

Alternatively, these systems can be applied by spraying. A distinction is made between non-chemically cross-linked casting elastomers and highly crosslinked duromers or casting resins.

Within the scope of the invention, and as an embodiment of the invention, polyisocyanate polyaddition product foams are understood to be foams according to DIN 7726.

Polyisocyanate polyaddition product binders include binders for gum granules, polyisocyanate polyaddition product rigid foam wastes and for inorganic products.

To prepare an embodiment of the invention, polyisocyanates are reacted with compounds having at least two isocyanates-reactive hydrogen atoms (like OH— or $NH_2$-groups) and a molecular weight of at least 350 g/mol, optionally low molecular weight chain extenders and/or crosslinking agents, if appropriate catalysts, optionally propellants and optionally other additives to form a reaction mixture and reacting to the polyisocyanate polyaddition product.

The polyisocyanate component used for the production of the polyisocyanate polyaddition products according to the invention comprises all polyisocyanates. These include for example the aliphatic, cycloaliphatic and aromatic divalent or polyhydric isocyanates known from the prior art, as well as any mixtures thereof. Examples include 2,2'-, 2,4'- and 4,4'-diphenylmethane diisocyanate, which comprise mixtures of monomeric diphenylmethane diisocyanates and higher-core homologues of the diphenylmethane diisocyanate (polymer MDI), isophorone diisocyanate (IPDI) or its oligomers, 2,4- or 2,6-tolylene diisocyanate (TDI) or mixtures thereof, tetramethylene diisocyanate or its oligomers, hexamethylene diisocyanate (HDI) or its oligomers, naphthylene diisocyanate (NDI) or mixtures thereof.

The polyisocyanate component can be used in the form of polyisocyanate prepolymers.

Polyols and polyamines are known to a person skilled in the art. They have at least two reactive hydrogen atoms and a molecular weight of at least 350 g/mol, and can be used as compounds having at least two hydrogen atoms reactive towards isocyanates and a molecular weight of at least 350 g/mol. These have, for example, a functionality of 2 to 8 and a molecular weight of 350 to 12,000 g/mol. This includes or example: polyether(-ester, carbonate)polyamines, polythiopolyether(-ester, carbonates), polyether(-ester, carbonat)amides and/or hydroxyl-group containing polyacetals and aliphatic polycarbonates and acrylates or mixtures thereof.

Shape

The gasket is preferably configured to surround at least part of the monopile. As the cross section of a monopile is usually circular and the outer shape of the top part is the normally a truncated cone the presently disclosed gasket is therefore preferably shaped as a hollow elongated body, i.e. a body that fits in between the corresponding transition piece and monopile. The gasket may further be adapted for formfitting inside the normally hollow bottom part of the transition piece. Depending on the shape of the monopile and the corresponding transition piece, it may be advantageous that the presently disclosed gasket is shaped as a hollow cylinder, a hollow truncated cone, or any combinations thereof.

Hence, in one embodiment the hollow elongated body is selected from the group consisting of: hollow cylinder, hollow truncated cone, and any combinations thereof.

FIG. 2 shows an embodiment of the gasket 3 shaped as a hollow truncated cone. The central and longitudinal direction of the monopile is indicated by the line D-D. FIG. 2A shows a perspective view of the gasket 3. FIG. 2B shows vertical cross sectional views, where the truncated cone shape is seen, and exemplary dimensions of the gasket are further indicated. In FIG. 2B, the height of the cone is 9382.7 mm, and the wall thickness of the cone is 75 mm. FIG. 2C shows a horizontal cross sectional view of the cone, illustrating the lower and upper diameters of the truncated cone. If the embodiment in FIG. 2C is manufactured in PUR with the material properties as indicated herein, the weight of the gasket would be approximately 15.7 metric tons.

The dimensions of the gasket are partly determined by the dimensions of the corresponding monopile and transition piece to which the gasket must usually be formfitted, and partly by consideration to stress absorption ability and material costs. The larger the dimensions of the gasket, the higher the strength and stress absorption capacity of the gasket. However, bigger dimensions are also associated with higher weight and costs of the gasket.

In a further embodiment the hollow elongated body has a wall thickness of at least 10 mm, more preferably at least 20 mm, even more preferably at least 30 mm, yet more preferably at least 40 mm, and more preferably at least 50 mm yet more preferably at least 60 mm, most more preferably at least 70 mm, or between 30-100 mm, more preferably between 50-80 mm, and most preferably between 60-80 mm.

In a further embodiment of the invention, the hollow elongated body has a height of at least 2 m, or at least 3 m, or at least 5 m, or at least 7 m, or at least 8 m, or between 5-20 m, more preferably between 7-15 m, and most preferably between 9-12 m.

In a further embodiment the hollow elongated body is a hollow truncated cone defined by lower and upper diameters, wherein the lower diameter is between 4-14 m, more preferably between 6-9 m, and the upper diameter is between 5-15 m, more preferably between 7-10 m.

In a further embodiment the gasket is self-supported, i.e. it is a self-supporting structure, Thus, the gasket may be manufactured separately, and not as part of the monopile or the transition piece, and the body will therefore typically not be a coating.

Flange

Figure 4A:
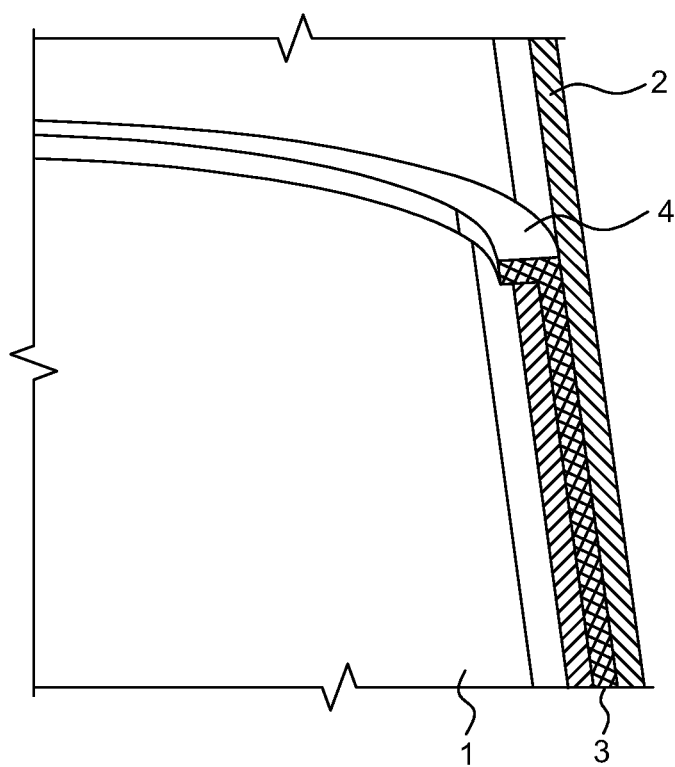
FIGS. 4A and 4B show the FIG. 1 embodiment of the gasket 3 comprising the flange 4 portion extending in the horizontal and radial direction of the cone, and further configured to engage with the top part of the monopile 1.
Figure 4B:
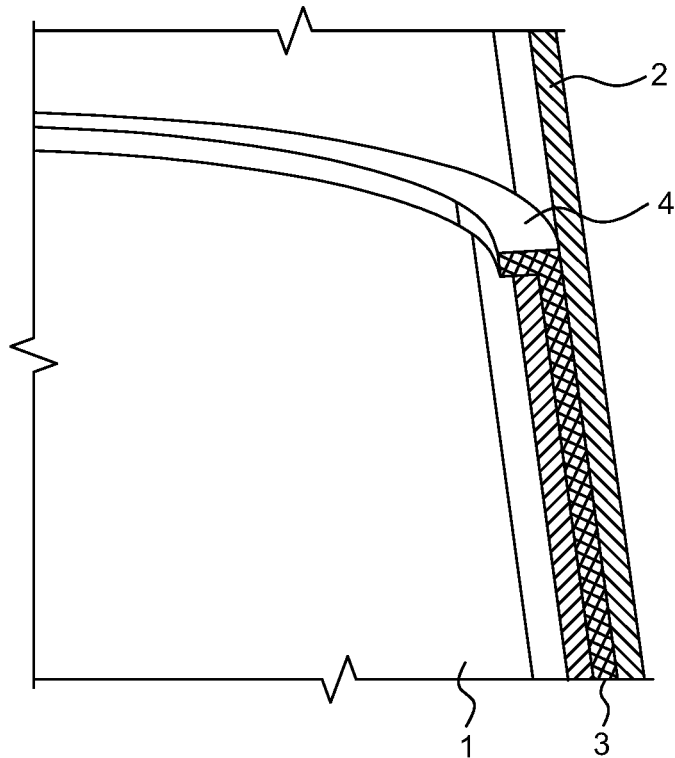

The gasket is preferably configured to surround at least part of the monopile, and further preferably adapted for formfitting to the bottom part of the transition piece. In a further embodiment the presently disclosed gasket comprises an upper horizontal flange 4 having a flange portion extending in the radial direction of the gasket, as illustrated in FIGS. 4A-B. The horizontal/radial length of the flange portion is only a small of the upper diameter of the gasket. The flange 4 may be provided to ensure a better fit inside the transition piece, for example to engage/abut another flange portion in the bottom part of the transition piece. The monopile may also comprise a flange portion whereon the flange of the gasket can rest. In that case the flange of the gasket may be configured to fluctuate with the flange of the monopile during movements. However, the flange is not an essential feature of the gasket. For example with a cone shaped monopile, a corresponding cone shaped transition piece and matching gasket in between, an upper flange is not necessary to obtain the desired functionality of the gasket.

Apertures in Flange Surface

The dimensions of the gasket correlate positively with both the strength and stress absorption capacity of the gasket, as well as the weight and cost of the gasket. Advantageously and without compromising the strength and stress absorption capacity, the gasket may therefore comprise openings or apertures in the surface, whereby the weight and material costs are reduced.

FIG. 3 shows an embodiment of a gasket 3 shaped as a hollow truncated cone, where the curved surface of the cone further comprises multiple openings 5 in the shape of circular holes. FIG. 3A shows a perspective view of the gasket. FIG. 3B shows vertical cross sectional views, where the truncated cone shape is seen, and exemplary dimensions of the gasket are further indicated. The central and longitudinal direction of the monopile is indicated by the line D-D. FIG. 3C shows a horizontal cross sectional view of the cone, illustrating exemplary lower and upper diameters of the truncated cone, as well as the position of the apertures. The apertures may have a circular or oval shape or any combination thereof. The gaskets in FIGS. 2 and 3 have similar dimensions, one difference being the surface apertures in the embodiment in FIG. 3. If manufactured in RJR the weight of the gasket in FIG. 3 would be approx. 12.7 metric tons, i.e. the provision of the apertures as illustrated in FIG. 3 can reduce the weight of the gasket by approx. three metric tons. Another way to reduce the weight of the gasket is provide it as a meshed structure.

Figure 3A:
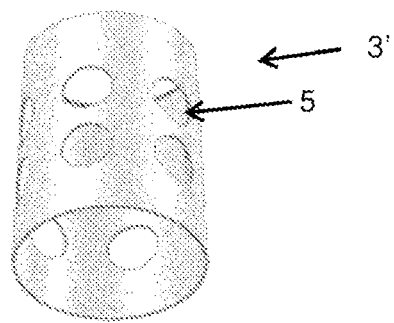
FIG. 3A shows a perspective view from the bottom of the gasket 3'.
Figure 3B:
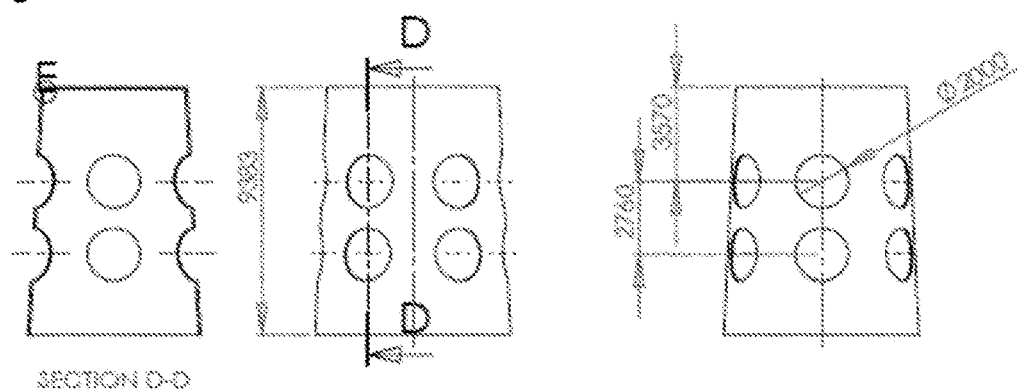
FIG. 3B shows vertical cross sectional views, where the truncated cone shape is seen, and exemplary dimensions of the gasket 3' are further indicated. The central and longitudinal direction of the monopile is indicated by the line D-D.
Figure 3C:
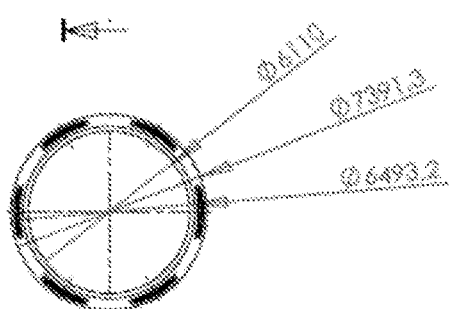
FIG. 3C shows a horizontal cross sectional view of the cone, illustrating the lower and upper diameters of the truncated cone, as well as the position of the holes. Exemplary dimensions of the lower and upper diameters and the gasket 3' are further indicated.
Figure 3D:
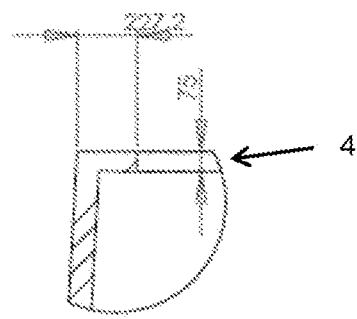
FIG. 3D shows an enlarged view of the flange 4 of the gasket 3'. The enlarged view corresponds to the area indicated as "E" in FIG. 3B. The flange 4 comprises a flange portion that is extending in the horizontal and radial direction of the cone, thus the horizontal portion of the flange forms an angle above 90° relative to the wall of the cone. Exemplary dimensions of cone wall thickness and extension of the horizontal flange portion are indicated.

As for the gasket without openings shown in FIG. 2, the gasket with openings may further comprise a radial, and optionally horizontal, flange portion. FIG. 3D shows an enlarged view the area indicated as "E" in FIG. 3B, illustrating a flange portion that is extending in the horizontal and radial direction of the cone, thus the horizontal portion of the flange forms an angle above 90° relative to the wall of the cone.

In a further embodiment the total area of the apertures constitutes between 10-70% of the area of the surface of the cone, more preferably between 20-50%, and most preferably between 25-40%.

In a further embodiment of the invention, the openings are placed at a distance from the two ends of the hollow elongated body, i.e. the top part and the bottom part of the gasket does not comprise apertures, because the top part and the bottom part will carry most of the stress induced when the transition piece is moving due to for example wind. In one embodiment the apertures may therefore be placed at a distance ranging from 1-5 m from the lower part and upper part of the hollow elongated body, more preferably at a distance ranging from 2-4 m, and most preferably at a distance ranging from 3-4 m.

Gasket Assembled from Parts

The presently disclosed gasket may be one single structure primarily manufactured in an elastomeric material and shaped as a hollow elongated body. However, the presently disclosed gasket 3 or 3' may also be assembled from multiple parts. A gasket assembled from multiple parts facilitates the assembly between transition piece and monopile by reducing the requirements to the assembly equipment as well as the gasket manufacturing equipment. The weight of a gasket, or an assembled gasket, for covering a monopile may be significant. In an embodiment of the invention, the weight of the gasket or assembled gasket is between 10000-20000 kg, more preferably between 14000-18000 kg, and most preferably between 15000-17000 kg.

Thus, for a gasket comprising multiple parts, the installation of the gasket becomes more flexible, and it may be installed on land or below sea level, depending on which is logistically more cost efficient, thereby resulting in potential cost reductions. In an embodiment of the present disclosure, the gasket is therefore assembled from multiple parts.

Figure 5A:
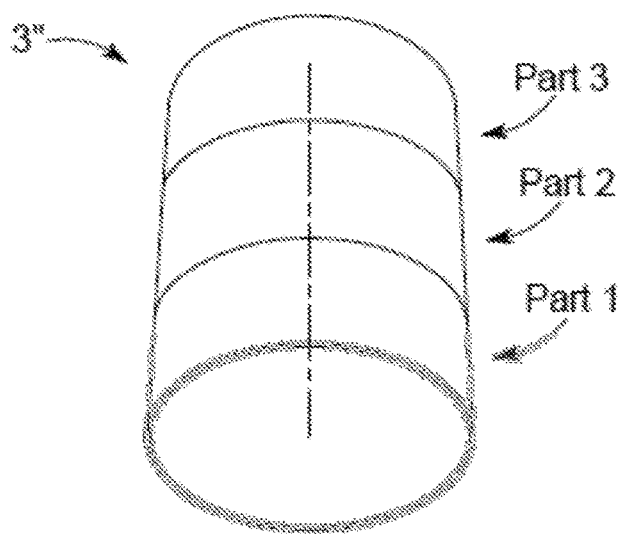
FIG. 5A shows a perspective view from the bottom of the gasket 3".
Figure 5B:
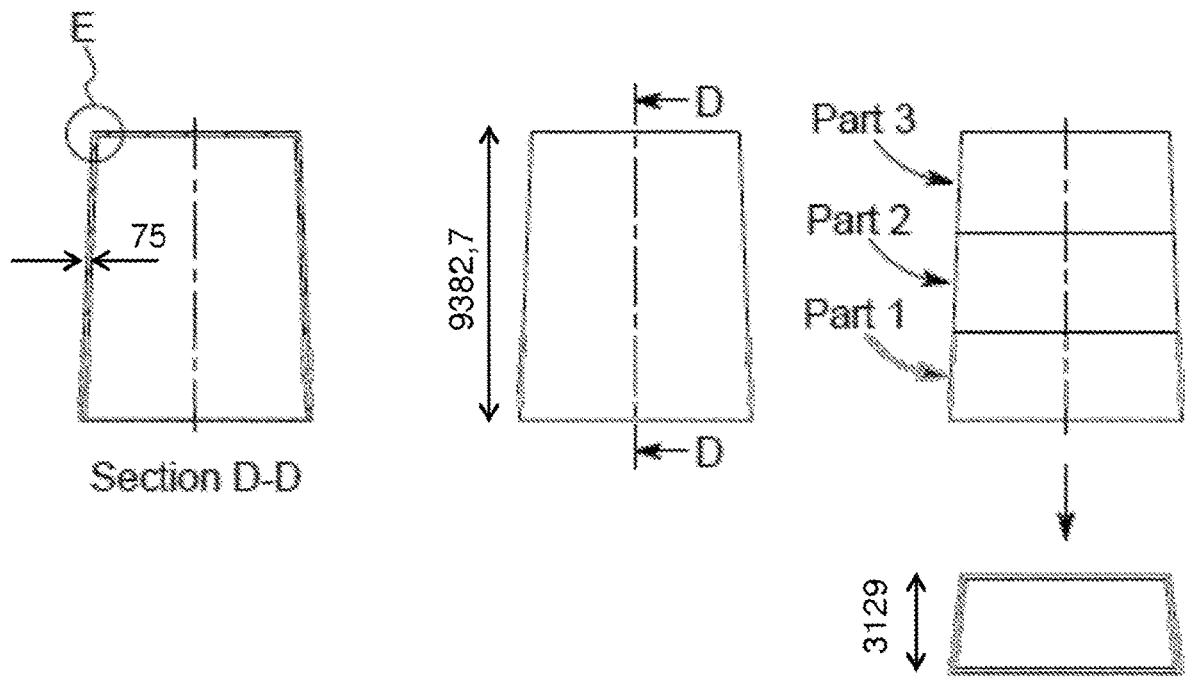
FIG. 5B shows vertical cross sectional views, where the truncated cone shape is seen, and the three parts 1-3 indicated. Exemplary dimensions of the gasket 3" and the parts 1-3 are further indicated. The central and longitudinal direction of the monopile is indicated by the line D-D.

FIGS. 5A-B show an embodiment of a gasket 3" assembled from three parts, where the first part (Part 1) is to be placed lowest, the third part (Part 3) is to be placed at the top of the monopile, and the second part (Part 2) is to be placed in between the other parts. FIG. 5A shows a perspective view from the bottom of the gasket 3", and FIG. 5B shows vertical cross sectional views, where the truncated cone shape is seen, and the three parts Part 1, Part 2 and Part 3 are indicated. Exemplary dimensions of the gasket 3" and the Parts 1-3 are further indicated. The central and longitudinal direction of the monopile is indicated by the line D-D.

From a cost efficiency perspective, the preferred number of parts is dependent on the weight of each part. The gasket 3" may be assembled from at least 2 parts, more preferably at least 3 parts, even more preferably at least 4 parts. In a further embodiment, the gasket 3" is assembled from 6 parts, more preferably 5 or 4 parts, and most preferably 2 or 3 parts.

In FIGS. 5A-B each part of the gasket 3" has the shape of a hollow truncated cone, which can be defined by first and second diameters where the first upper diameter is smaller than the lower second diameter. In a gasket 3" assembled from a plurality of parts the biggest diameter of one part therefore preferably corresponds to the smaller diameter of another part that follows below on the monopile and in the bottom of the transition piece. This facilitates that the gasket parts may be assembled sequentially, such that part 1 is first placed, followed by part 2, and then part 3. In an embodiment of the present disclosure, each part therefore has the shape of a hollow truncated cone.

For maximum stabilization of the position of the transition piece relative to the monopile, or for maximum stress absorption, the assembled gasket 3" is advantageously forming a continuous hollow truncated cone, and thus completely surrounding the part of the monopile. This may be obtained by the multiple cones of the gasket 3" having diameters that are configured such that the parts may be assembled to be immediately adjacently, thereby completely covering the monopile, as shown in FIGS. 5A and 5B in the sketches to the right. In an embodiment of the present disclosure, the diameters of the multiple cones are therefore configured such that the assembled cones form a continuous hollow truncated cone.

Figure 5C:
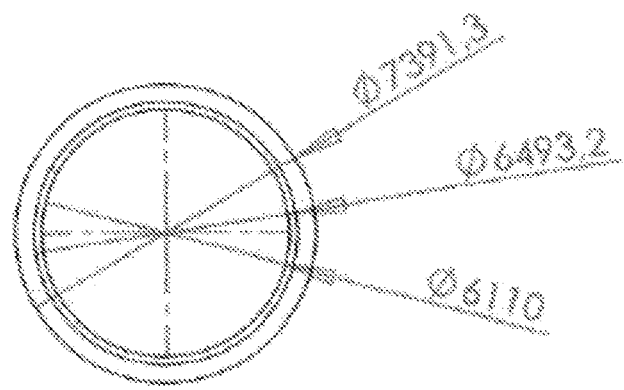
FIG. 5C shows a horizontal cross sectional view of the cone, illustrating the lower and upper diameters of the truncated cone. Exemplary dimensions of the lower and upper diameters of the gasket 3" are further indicated.

FIG. 5C shows a horizontal cross sectional view of the assembled cone, illustrating the lower and upper diameters of the truncated cone. Exemplary dimensions of the lower and upper diameters of the gasket 3" are further indicated.

Figure 5D:
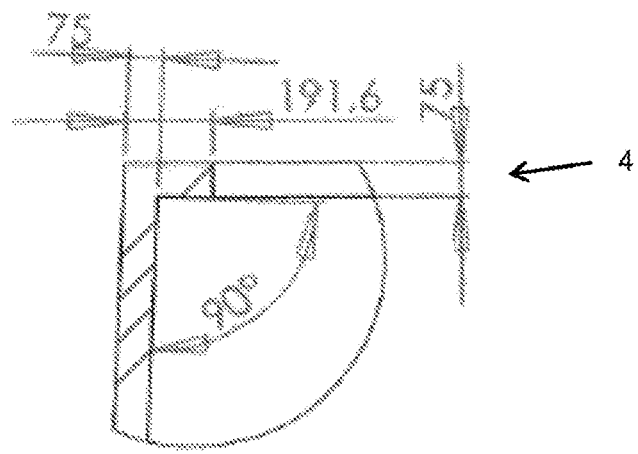
FIG. 5D shows an enlarged view of the flange 4 of the gasket 3", Part 3. The enlarged view corresponds to the area indicated as "E" in FIG. 5B. The flange 4 comprises a flange portion that is extending in the horizontal and radial direction of the cone, thus the horizontal portion of the flange forms an angle above 90° relative to the wall of the cone. Exemplary dimensions of cone wall thickness and extension of the horizontal flange portion are indicated.

Part 3 of the assembled gasket 3" may further comprise a flange 4. FIG. 5D shows an enlarged view of the flange 4 of the gasket 3", Part 3. The enlarged view corresponds to the area indicated as RE" in FIG. 5B. The flange 4 comprises a flange portion that is extending in the horizontal and radial direction of the cone, thus the horizontal portion of the flange forms an angle above 90° relative to the wall of the cone. Exemplary dimensions of cone wall thickness and extension of the horizontal flange portion are indicated in the figure.

Figure 12:
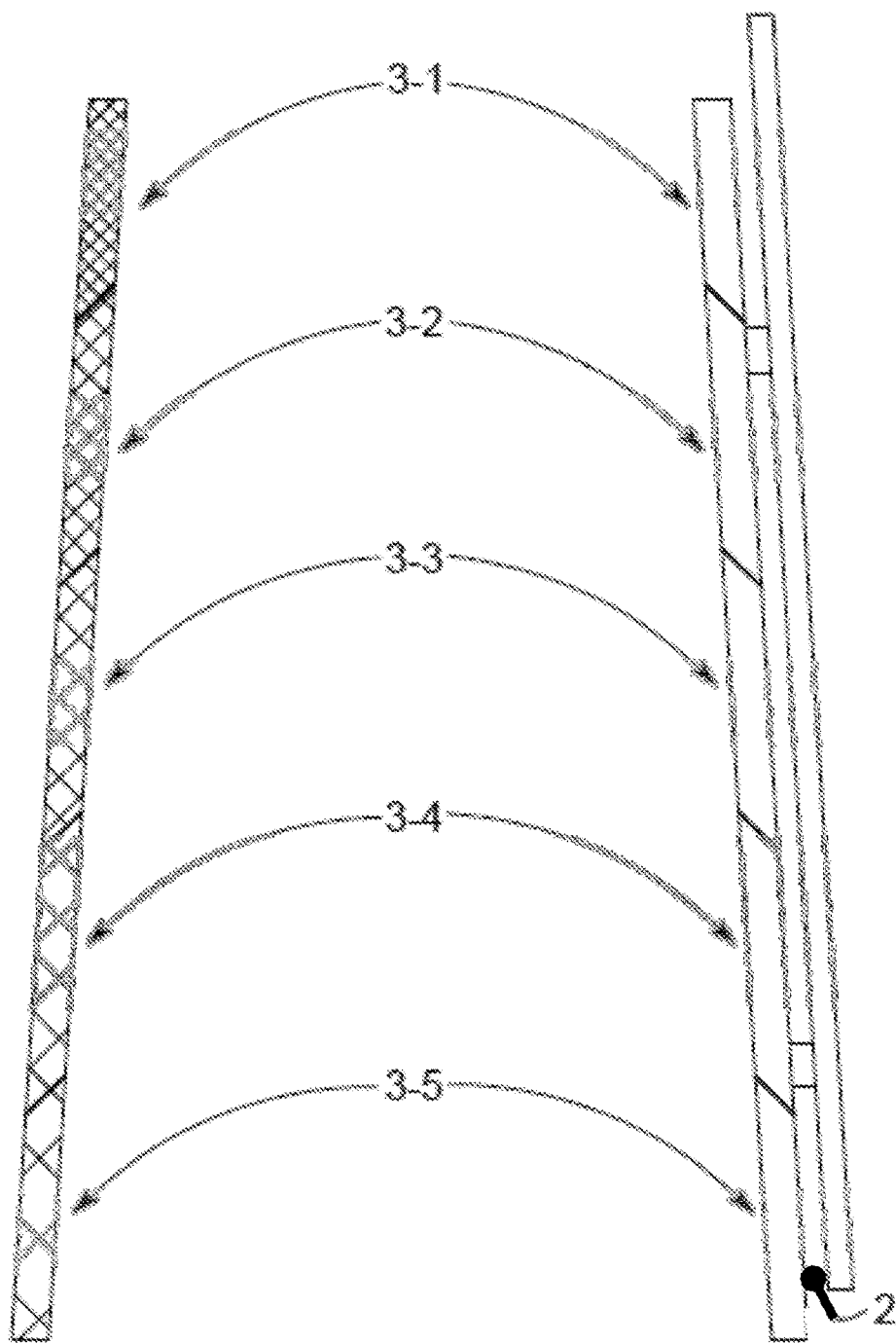
FIG. 12 shows an embodiment of the disclosure, where the gasket comprises five cone-shaped parts (parts 3-1, 3-2, 3-3, 3-4, and 3-5) configured to be assembled into a cone shaped gasket. The Figure shows the gasket in a cross-sectional view, and at least one of the perimeter edges of each part form an acute angle, such that abutting parts are assembled in a wedge like manner. The contact area to the transition piece 2 is indicated as the position relative to the transition piece 2 is shown in the right side of FIG. 12.

FIG. 12 shows a further embodiment of a gasket comprising and assembled from multiple parts. The position relative to the transition piece 2 is shown in the right side of the Figure.

To make the transport and assembly of the gasket more simple, it is advantageous that the gasket comprises multiple parts, where abutting parts are configured to be matched in a predetermined way. For example, the multiple parts may be matching each other in a similar manner as a puzzle, where abutting parts can be fitted in only predetermined ways.

For a conical shaped gasket comprising multiple conical parts, placed on top of each other, or in extension of each other, as shown in FIG. 12, the abutting parts are the edges forming the bottom and top perimeter of the truncated cone. The abutting edges may form an acute angle relative to the outer surface of the cone, whereby the conical parts are assembled in a nesting or wedge like manner, when placed on top of each other.

In a preferred embodiment, the abutting parts are cylindrical or cone-shaped and at least one of the edges along the top and bottom perimeters form an acute angle, such that abutting parts can be matched or assembled in a wedge like manner.

The gasket shown in FIG. 12 comprises five conical parts 3-1, 3-2,34,3-4, and 3-5. For the three parts placed in the middle 3-2, 3-3, 3-4 both the top and bottom perimeters are abutting a neighboring cone, and both perimeter edges are forming an acute angle. For the two parts 3-1, 3-5 placed at the top and bottom of the assembled gasket cone, only respectively the bottom perimeter edge, and the top perimeter edge are abutting a neighboring cone. Thus, optionally only one of the perimeters edges are forming an acute angle.

The gasket according to the present disclosure may form a continuous surface contact area to the transition piece as illustrated in the embodiment of FIGS. 1 and 4. In addition or alternatively, the gasket may form a discontinuous surface contact area to the transition piece as illustrated in the embodiment of FIG. 12.

Applications

The presently disclosed gasket may be used for mounting any onshore or offshore wind turbine related structure. This includes that it is suitable for mounting a transition piece to a pile structure, e.g. mounting a transition piece to a monopile, or mounting the transition piece to any other type of foundation structure for contact with the sea bed, such as a pile for a tripod or a tetrapod. Each of the respectively three or four piles, or legs, of a tripod or a tetrapod, may be considered equivalent to a monopile.

The presently disclosed gasket is further suitable for mounting other offshore wind turbine related structures with corresponding structural geometries as the transition piece to a pile structure.

Wind turbine structures may have a transition piece or a tower, which comprises of multiple elements, or sections. The sections may comprise similar tubular or conical assembly shape as the transition piece to pile structure. The gasket may therefore be suitable for mounting multiple elements of a transition piece, or for mounting multiple tower sections.

Figure 6:
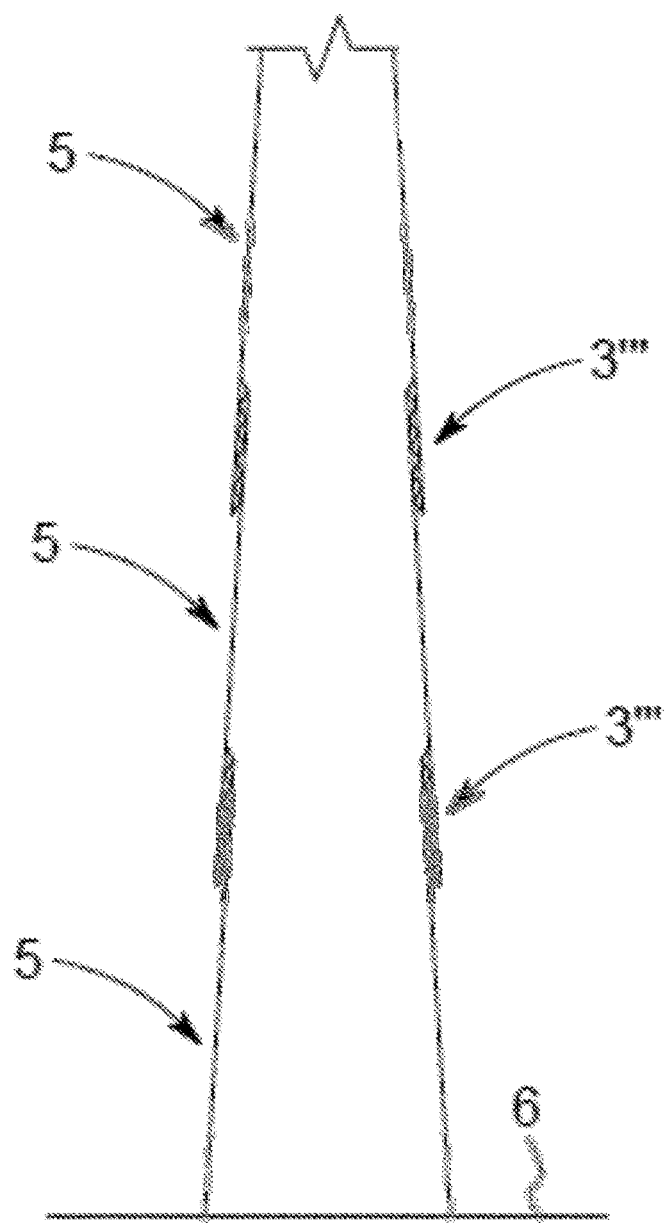
FIG. 6 shows a cross sectional embodiment of a wind mill tower assembled from three tower sections 5, and where the sections are assembled and mounted with an embodiment of the gasket 3''' according to the present disclosure. The tower sections are conical in shape, and the gasket is mounted on the end with the smaller diameter on the lower positioned section. The parts are assembled by lowering the end with the larger diameter of the upper positioned section such that the gasket is sandwiched in the cone shaped contact area between the two sections.

To produce larger, and thus more efficient wind turbine towers, the tower is practically produced by assembling a multiple of tower sections. FIG. 6 shows a cross sectional embodiment of a wind mill tower assembled from three tower sections 5, and where the sections are assembled and mounted with an embodiment of the gasket 3''' according to the present disclosure. The tower sections are conical in shape, and the gasket is mounted on the end with the smaller diameter on the lower positioned section. The parts are assembled by lowering the end with the larger diameter of the upper positioned section such that the gasket is sandwiched in the cone shaped contact area between the two sections.

The assembled tower sections are equivalent to the assembly of monopile and transition piece, where the lower positioned tower section corresponds to the monopile, and the upper positioned tower section corresponds to the transition piece.

In addition to facilitating the production of larger scale towers, the gasket may further provide flexibility to the tower. Thus, when the tower is exposed to stresses from both the environmental surroundings and the moving parts of the turbine, the stress tolerance of the tower is improved.

Figure 7:
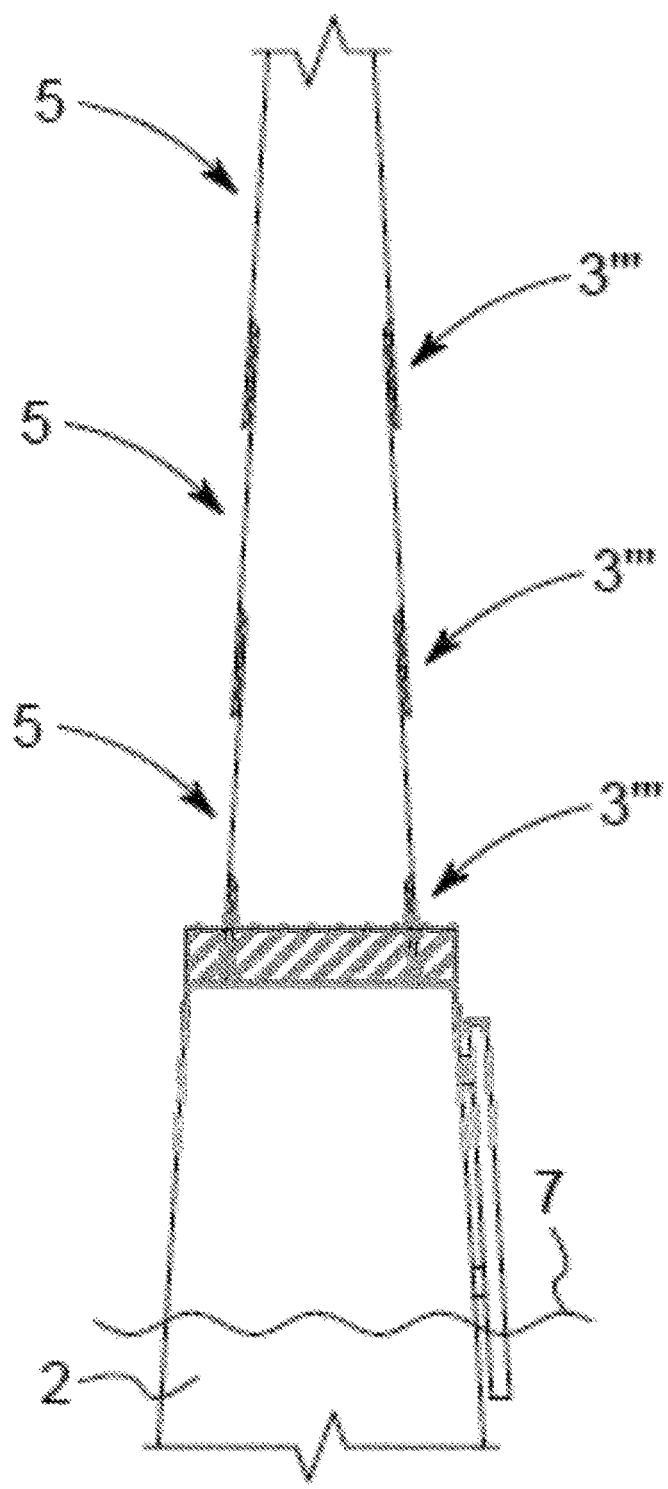
FIG. 7 shows a cross sectional embodiment of the wind mill tower shown in FIG. 6, where the tower is placed offshore on a transition piece 2, positioned at sea level 7.

The assembly of the tower sections may be carried out on land 6, Le, onshore, before being placed offshore. FIG. 7 shows a cross sectional embodiment of the wind mill tower shown in FIG. 6, where the tower is placed offshore at sea level 7, and mounted on a transition piece 2.

The tower sections are large scale structures, and it is therefore advantageous that the gasket can be formfitted to the tower dimensions.

In an embodiment of the invention, the thickness of the gasket is between 10-60 mm, more preferably between 20-50 mm or between 30-40 mm. In a further embodiment, the height of the gasket is between 2000-7500 mm, more preferably between 2500-6500 mm, or between 3000-6000 mm.

The wind turbine structure is mounted into the ground by e.g. a monopile that is driven into the sea bed, Equivalently to a monopile, the large scale structures may be mounted on a jacket foundation, such as a tripod or tetrapod foundation. Jacket foundations may provide a stronger and more flexible foundation, since the weight of the structure is supported by multiple piles, or legs, rather than a single monopile.

Figure 8:
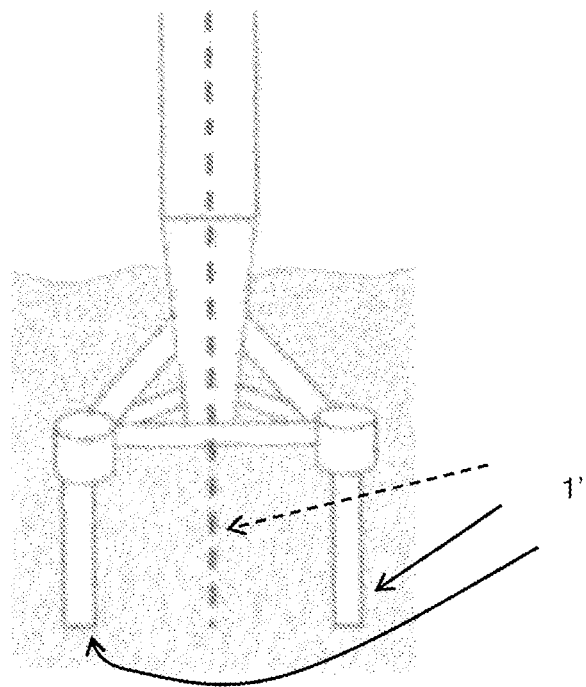
FIG. 8 shows an embodiment of a jacket foundation, where the foundation is a tripod comprising three legs 1'.
Figure 9:
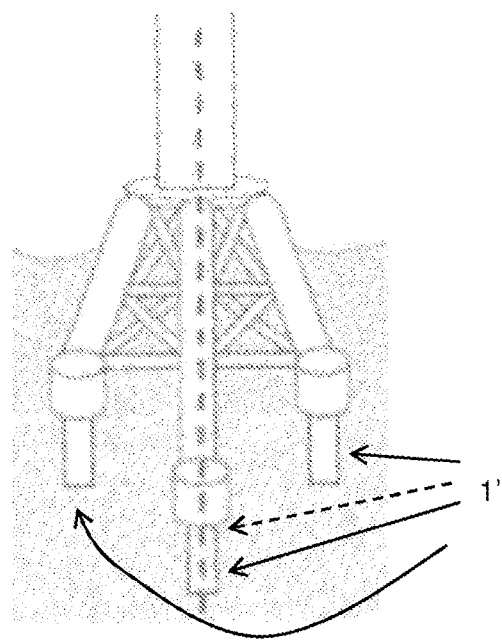
FIG. 9 shows an embodiment of a jacket foundation, where the foundation is a tetrapod comprising four legs 1'.

FIG. 8 shows an embodiment of a jacket foundation, where the foundation is a tripod comprising three legs 1'. FIG. 9 shows an embodiment of a jacket foundation, where the foundation is a tetrapod comprising four legs 1'.

To facilitate the assembly of the foundation as well as to provide flexibility to the foundation, it may be advantageous that the foundation pile(s) or leg(s) are assembled by gaskets from multiple parts, such as a lower part leg for contact with the sea bed, and an upper part leg for contact with the transition piece.

Thus, an assembled foundation leg is equivalent to the assembly of monopile and transition piece, where the lower part leg corresponds to the monopile, and the upper part leg corresponds to the transition piece.

Figure 10:
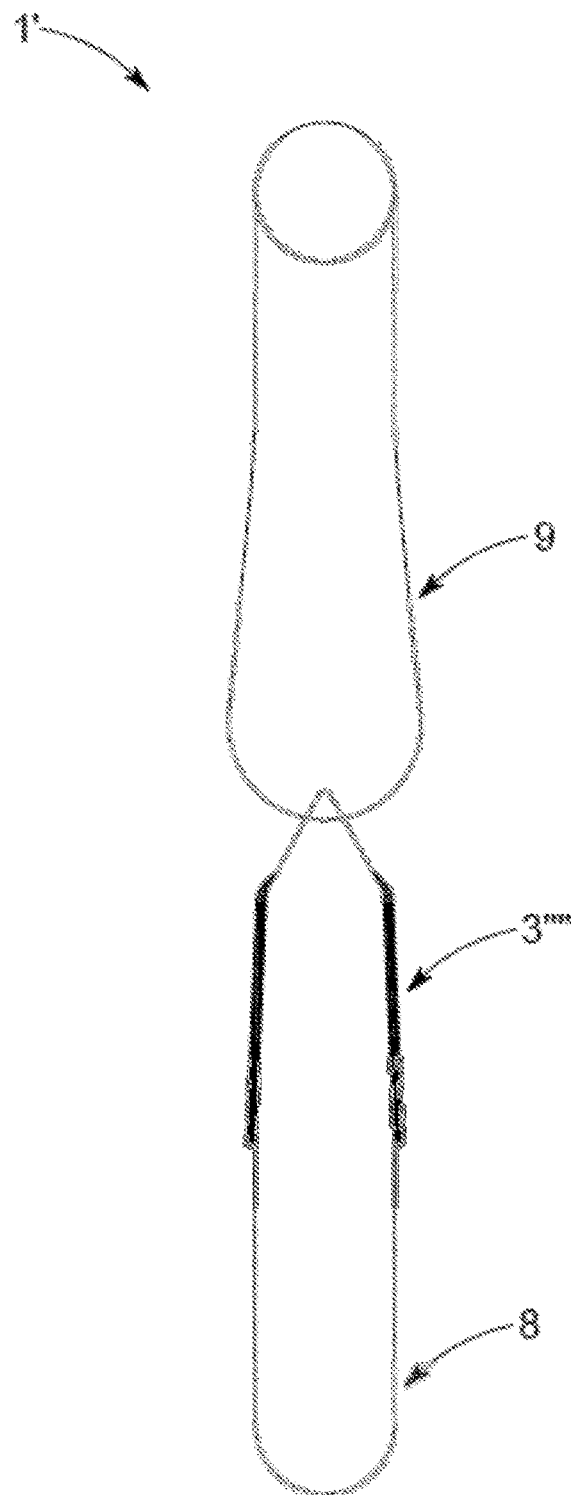
FIG. 10 shows an exploded view of an embodiment of a foundation leg 1', comprising a lower part for contact with the sea bed 8, and an upper part for contact to the transition piece 9, and where the lower and upper part form a cylindrical formfitted assembly. The gasket 3'' is mounted on the lower part, and upon assembly, the gasket is sandwiched in the contact area between the two parts.

FIG. 10 shows an exploded view of an embodiment of a foundation leg 1', comprising a lower part for contact with the sea bed 8, and an upper part for contact to the transition piece 9, and where the lower and upper part form a cone shaped formfitted contact area. The gasket 3'''' is mounted on the lower part, and upon assembly, the gasket is sandwiched in the cone shaped contact area between the two parts.

The leg 1' shown in FIG. 10 may constitute the foundation of any wind turbine structure. In an embodiment of the invention, the leg is part of a monopile. In a further embodiment of the invention, the foundation is a jacket foundation, such as a tripod or tetrapod foundation, thus comprising respectively three or four legs.

Figure 11:
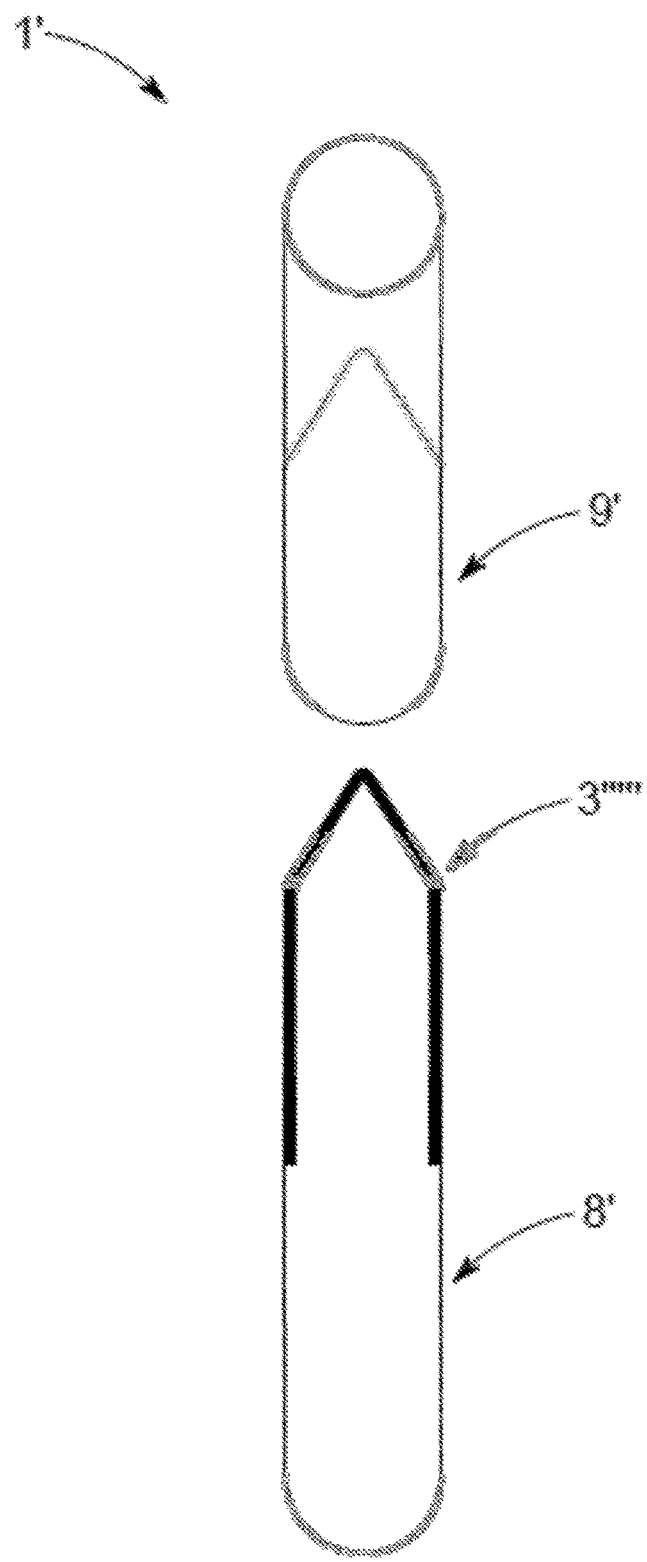
FIG. 11 shows an exploded view of an embodiment of a foundation leg 1', comprising a lower part for contact with the sea bed 8', and an upper part for contact to the transition piece 9', and where the lower and upper part form a closed tubular formfitted assembly. The gasket 3'''' is mounted on the lower part, and upon assembly, the gasket is sandwiched in the contact area between the two parts.

The assembled leg may be assembled with other geometries as illustrated in FIG. 11, where the gasket 3'''' is closed in one end, thus enclosing the one end of the lower part 8' for contact with the sea bed. Thus, when the upper part for contact to the transition piece 9', and the lower part is assembled, the gasket is sandwiched in the complete contact area between the two parts.

Both FIGS. 10 and 11 show embodiments where the gasket is a hollow elongated body. However, for the embodiment with a closed end gasket, the contact area between gasket and foundation leg is larger, A larger contact area may be advantageous, to improve the flexibility of the foundation leg. In a preferred embodiment of the invention, the hollow elongated body is closed in one end.

The foundation legs are large scale structures, and it is therefore advantageous that the gasket can be formfitted to the legs.

In an embodiment of the invention, the thickness of the gasket is between 10-60 mm, more preferably between 20-50 mm or between 30-40 mm.

In a further embodiment, the height of the gasket is between 3000-7000 mm, more preferably between 3500-6500 mm, or between 4000-6000 mm.

In a further embodiment, the diameter of the gasket is between 500-5000 mm, more preferably between 1000-4000 mm or between 1200-2650 mm.

The invention claimed is:

1. A method for manufacturing a gasket for a bottom part of a transition piece of a wind turbine, the method comprising the steps of:
   gradually spraying a fluid elastomeric material onto a bottom inner surface of a section of the transition piece that will be assembled with a pile structure, such that a layer of elastomeric material is formed; and
   curing the layer of elastomeric material such that a gasket is formed,
   wherein the gasket is configured for formfitting the bottom part of the transition piece of the wind turbine, the gasket being shaped as a hollow elongated body for surrounding at least a part of the pile structure, when mounted between the transition piece and the pile structure, such that the gasket stabilizes the position of the transition piece relative to the pile structure.

2. The method of claim 1, wherein the spraying is selected from the group consisting of: thermal spraying, spray drying, and combinations thereof.

3. The method of claim 1, wherein the fluid elastomeric material is a solution or precursor of the elastomeric material.

4. The method of claim 1, wherein the fluid elastomeric material is selected from the group consisting of: polyurethane (PUR), rubber, nylon, polyoxymethylene (POM), polyethylene (PE), polyurea, and combinations thereof.

5. The method of claim 1, wherein the fluid elastomeric material is a solution of polyurea.

6. The method of claim 1, wherein the fluid elastomeric material is a polyurethane system.

7. The method of claim 1, wherein the transition piece and gasket form an integrated and free-standing unit.

8. The method of claim 1, further comprising the step of assembling the integrated transition piece and gasket to a pile structure, such that the gasket stabilizes the position of the transition piece relative to the pile structure.

9. A method for manufacturing a gasket for a bottom part of a transition piece of a wind turbine, the method comprising the steps of:
pouring a fluid elastomeric material into one or more preformed molds; and
curing the fluid elastomeric material to form a gasket comprising one or more parts,
wherein the gasket is configured for formfitting the bottom part of the transition piece of the wind turbine, the gasket being shaped as a hollow elongated body for surrounding at least a part of a pile structure, when mounted between the transition piece and the pile structure, such that the gasket stabilizes the position of the transition piece relative to the pile structure.

10. The method of claim 9, wherein the mold casting is selected from the group consisting of: hot casting, cold casting, and combinations thereof.

11. The method of claim 9, wherein the fluid elastomeric material is a solution or precursor of the elastomeric material.

12. The method of claim 9, wherein the fluid elastomeric material comprises diisocyantes selected from the group consisting of: toluene diisocyanate (TDI), diphenylmethane diisocyanate (MDI), aliphatic and unconventional isocyanates, and any combinations thereof.

13. The method of claim 9, wherein the fluid elastomeric material comprises polyols selected from the group consisting of: polyether, polyester polyols, and combinations thereof.

14. The method of claim 9, wherein the gasket is mold casted as one or more free-standing units.

15. The method of claim 9, further comprising the step of assembling the gasket from multiple cast units.

16. The method of claim 9, further comprising the step of assembling the gasket between the transition piece and the pile structure, such that the gasket stabilizes the position of the transition piece relative to the pile structure.

17. The method of claim 9, further comprising the step of transporting the gasket to an assembly site.

18. A method for mounting a gasket for a bottom part of a transition piece of a wind turbine, the method comprising the steps of:
providing a gasket configured for formfitting the bottom part of the transition piece of the wind turbine, the gasket being shaped as a hollow elongated body for surrounding at least a part of a pile structure, when mounted between the transition piece and the pile structure, such that the gasket stabilizes the position of the transition piece relative to the pile structure, wherein the gasket forms a free-standing unit, and
assembling the gasket to the pile structure.

* * * * *